June 2, 1936. W. P. LLOYD ET AL 2,043,004
PHOTOCOPY MACHINE
Filed July 19, 1935 8 Sheets-Sheet 2

Fig. 2

INVENTORS
Whitten P. Lloyd and
Maxwell H. Hill
BY Harold E. Stonebraker
ATTORNEY June 2, 1936.  W. P. LLOYD ET AL  2,043,004

PHOTOCOPY MACHINE

Filed July 19, 1935  8 Sheets-Sheet 4

INVENTORS
Whitten P. Lloyd and
Maxwell H. Hill
BY Harold E. Stonebraker
ATTORNEY June 2, 1936.  W. P. LLOYD ET AL  2,043,004

PHOTOCOPY MACHINE

Filed July 19, 1935  8 Sheets-Sheet 5

INVENTORS
Whitten P. Lloyd and
Maxwell H. Hill
BY
Harold E. Stonebraker
ATTORNEY June 2, 1936.  W. P. LLOYD ET AL  2,043,004
PHOTOCOPY MACHINE
Filed July 19, 1935  8 Sheets—Sheet 6

INVENTORS
Whitten P. Lloyd and
Maxwell H. Hill
BY Harold E. Stonebraker
ATTORNEY June 2, 1936.　　　W. P. LLOYD ET AL　　　2,043,004
PHOTOCOPY MACHINE
Filed July 19, 1935　　　8 Sheets-Sheet 8

INVENTORS
Whitten P. Lloyd and
Maxwell H. Hill
BY Harold E. Stonebraker
ATTORNEY Patented June 2, 1936

2,043,004

UNITED STATES PATENT OFFICE 2,043,004

PHOTOCOPY MACHINE

Whitten P. Lloyd and Maxwell H. Hill, Rochester, N. Y., assignors to The Haloid Company, Rochester, N. Y., a corporation of New York Application July 19, 1935, Serial No. 32,246

12 Claims. (Cl. 164—49)

This invention relates to a photocopy machine, with more particular reference to the type of apparatus in which drawings, documents, and the like, are photographed on a sheet of sensitized paper that travels through the machine from a roll, the exposed portion being fed and severed after each exposure, and it has for one object to afford efficient and simple mechanism for controlling the feeding of the paper in order to render more accurate and facilitate the several operations, and to effect an economy in the paper consumption by reducing the amount of wastage.

The invention has for one specific purpose to afford a construction in which a pressure roll, that holds the paper against a feeding roll, is positioned away from in front of the focal plane during exposure, the paper at such time being held by a clamping means, the pressure roll being moved up into engagement with the feeding roll and the clamping means withdrawn prior to the paper feeding operation, which takes place after exposure. This avoids a substantial paper waste that occurs in previous types of machines due to the pressure roll or one of the feeding rolls always being located in front of the focal plane, resulting in wasting the amount of paper between the feeding rolls and the cutting mechanism.

Another object of the invention is to afford a simple and practical mechanism in which the amount of paper fed at each paper feeding operation depends upon the position of the curtain and is controlled by a member that is automatically positioned when the curtain is adjusted, and which serves to stop the operation of the paper feeding mechanism in accordance with the position of the curtain so that when the curtain is once positioned at a given point, all subsequent operations of the paper feeding mechanism will cause a fixed amount of paper to be fed, which will not vary until the position of the curtain is again changed.

A further object of the invention is to afford simple and improved instrumentalities that cooperate both with the feeding mechanism and with the paper cutting mechanism so that operation of a control member in one direction effects movement of the parts necessary to bring about feeding of the paper while operation of the same member in an opposite direction causes the paper to be severed.

Additional objects of the invention consist in the provision of improved paper guiding and paper feeding means so as to prevent twisting or skewing of the paper, or flexing of its edges, as it is fed through the machine.

To these and other ends, the invention consists in the construction and arrangement of parts that will appear from the following description when read in conjunction with the accompanying drawings, the novel features being pointed out in the claims following the specification.

Figure 1:
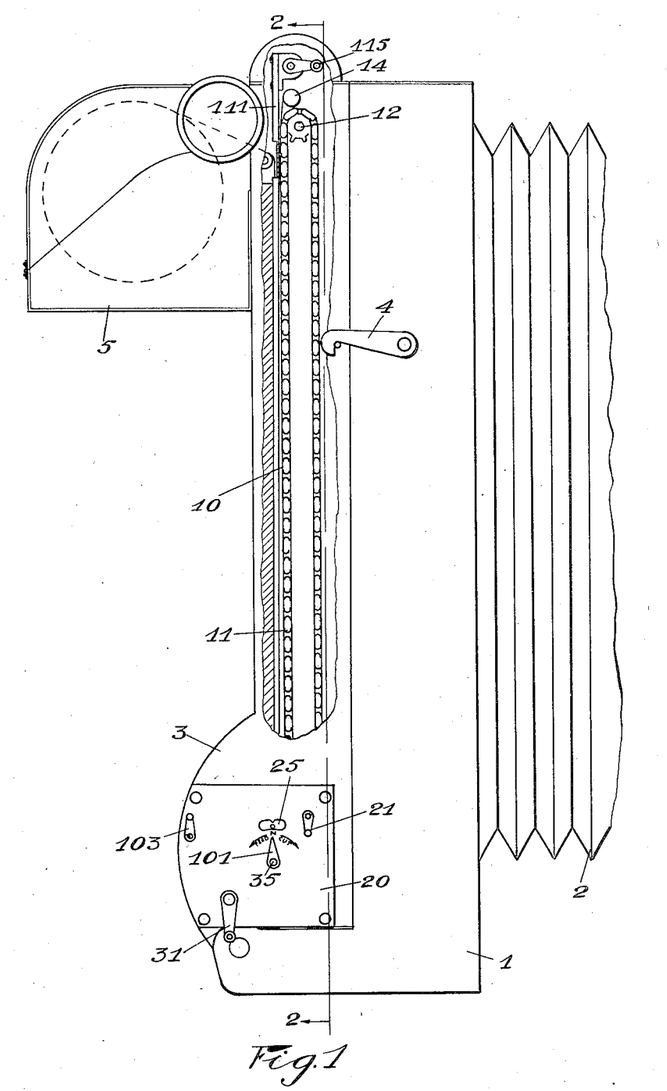
Fig. 1 is a side elevation, partially broken away, of a photocopy machine incorporating one embodiment of the invention.

While the invention is illustrated in a hand controlled machine, the structure to be described is likewise applicable to an electrically or automatically controlled machine, and referring more particularly to the drawings in which like reference characters refer to the same parts throughout the several views, 1 designates a camera body, see Fig. 1, 2 is the usual bellows, 3 is the pivoted magazine normally held in operative relation to the body 1 by the catches 4, and 5 is the roll box or sensitized paper container from which paper is threaded into the magazine 3, all substantially in accord with the structures disclosed in Patents Nos. 1,992,492, W. P. Lloyd, February 26, 1935, and 1,998,324, W. P. Lloyd, April 16, 1935.

In the mechanism of Patent No. 1,992,492, the curtain was correlated with the paper feeding mechanism in such a manner that the latter was idle while the curtain was moved to open position, and the paper feed mechanism was operated as the curtain was returned to closed position, thus necessitating returning the curtain after each exposure to feed the paper. In the present structure, the curtain may remain in a fixed open position for successive exposures, and the curtain opening operation serves to control the paper feed mechanism in such a manner that repeated operations of the latter will always effect feeding of a given amount of paper, dependent upon the position of the curtain. The descriptive matter immediately following has to do with the curtain and its operating mechanism.

Figure 2:
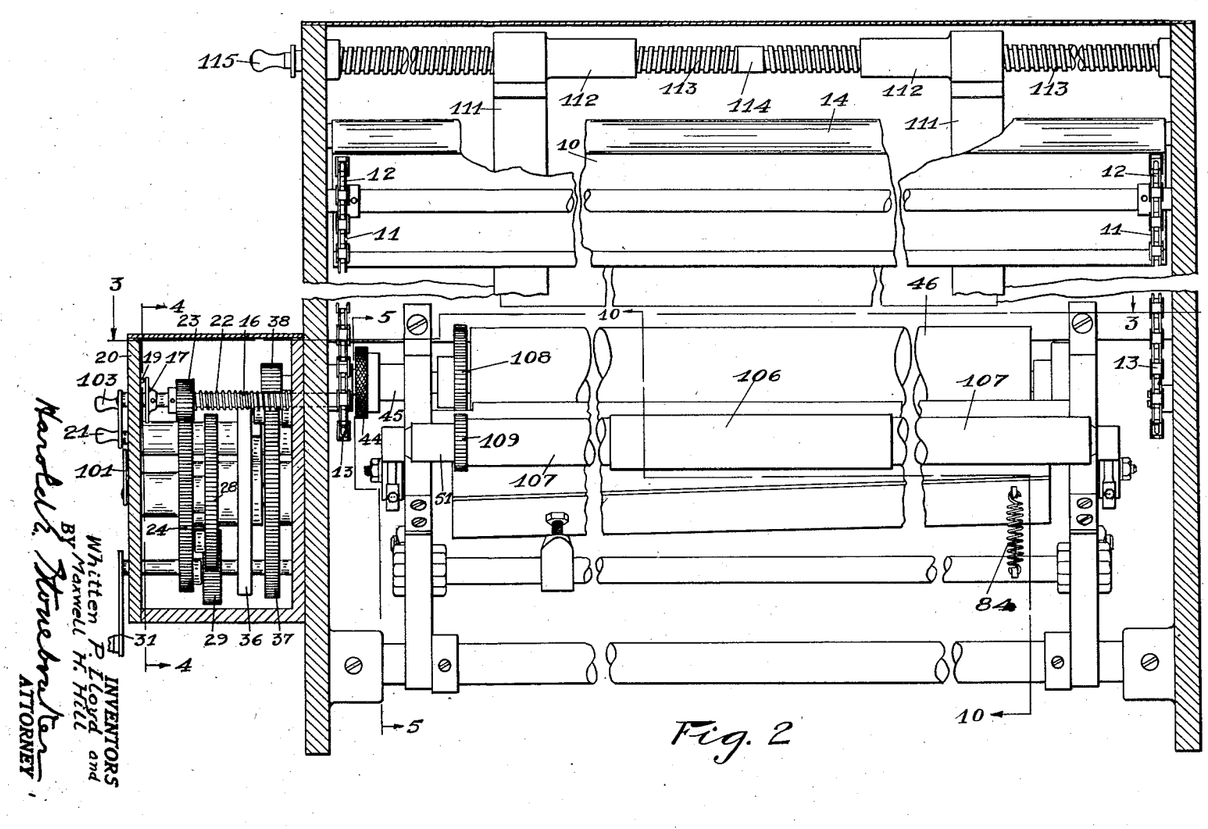
Fig. 2 is a vertical sectional view on line 2—2 of Fig. 1 looking in the direction of the arrows, and showing the parts arranged for moving the curtain with the pressure roll in its lowered position.

The curtain is designated at 10, see Figs. 1 and 2, its lower end being fastened to endless chains 11 which travel around sprockets 12 and 13. The upper end of the curtain is fastened to and wound upon a spring roller 14, suitably mounted in the magazine, and which acts to retract the curtain upwardly as the chains to which it is connected are moved in a corresponding direction, and when said chains are moved in the opposite direction, the curtain is drawn by them downwardly to its closed position.

The left hand sprocket 13, see Fig. 2, is splined on an operating shaft 16 so as to turn when the said shaft is rotated and also permit relative endwise movement of the latter. The shaft 16 has fixed thereon a stop plate 17 with a series of openings 18 therein, see Fig. 8, adapted to selectively engage a fixed stop 19 on the inner surface of the outer wall of the gear box 20, see Fig. 2. The shaft 16 extends through the walls of the gear box and carries an operating handle 21 at its outer end, while 22 is a spring surrounding the shaft 16 and located between the pinion 23, fixed thereon, and the inner wall of the gear box, and acting normally to force the operating shaft 16 to its outermost position, as shown in Fig. 3.

To open the curtain, or change the position of the curtain, the handle 21 and shaft 16 are pushed inwardly against the tension of spring 22, as shown in Fig. 2, and the handle 21 is then turned until the curtain is in the desired position for exposure, and upon releasing the handle, the spring 22 forces the shaft outwardly and one of the openings 18 in stop plate 17 engages the stop 19 and holds the shaft 16, and likewise the curtain, in the position to which it has been adjusted. In the present machine, it is unnecessary to change the position of the curtain after each exposure, or until a different sized opening is desired, and repeated exposures can be made with the curtain in one position. The feed mechanism and the structure by which the curtain setting determines the amount of paper feed will now be described.

Figure 3:
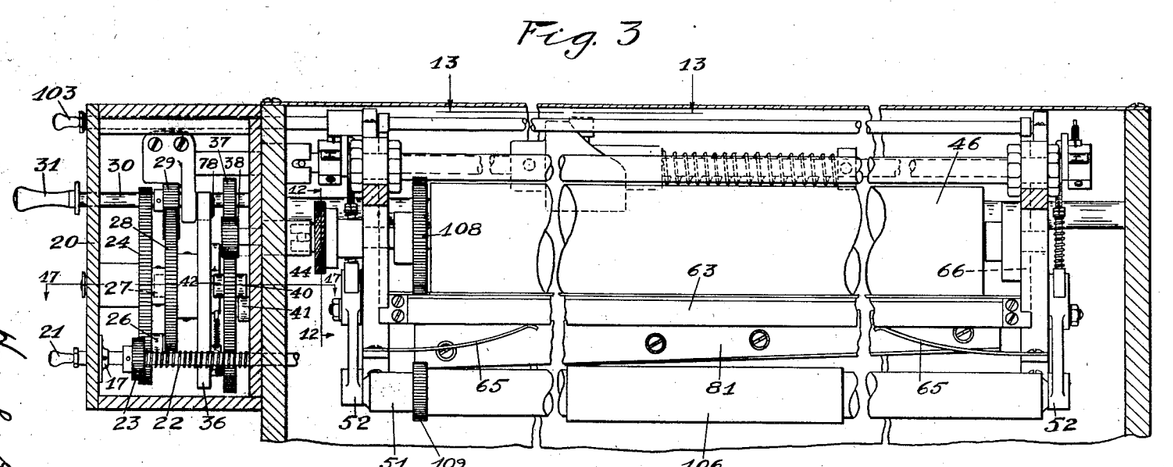
Fig. 3 is a horizontal sectional view on line 3—3 of Fig. 2 looking downwardly, the pressure roll being in its lowered position and the curtain adjusting mechanism in locked position.

The aforementioned pinion 23 on the curtain operating shaft 16 engages and drives a gear 24, see Figs. 2 and 3, which carries on its outer face certain indicia that can be observed through an opening 25 in the gear box 20, see Fig. 1, so that the operator can determine at any time the particular position of the curtain. On the rear face of the gear 24 is a stop or projection 26, see Fig. 3, adapted to cooperate with a stop 27 on a gear 28 that is engaged and driven by a pinion 29, and forms a part of the paper feed mechanism. Pinion 29 is fixed on shaft 30, see Figs. 2 and 3, which extends through the front wall of the gear box 20, and carries an operating handle 31 for effecting movement of the paper feed mechanism, the extent of such movement being determined when the aforementioned stop 27 on gear 28 engages stop 26 on gear 24, the position of the latter having previously been determined by the extent to which the curtain is opened. Gear 28 transmits movement to the paper feed roll through the mechanism that will now be described.

Figure 12:
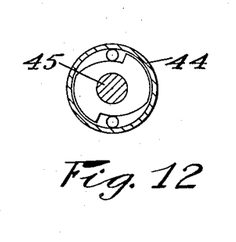
Fig. 12 is a detail sectional view on line 12—12 of Fig. 3.

Referring to Figs. 1, 3, 4, 6 and 17, the gear 28 is fixed on a shaft 35 which also has fixed thereon and spaced from the gear 28, see Fig. 2, an operating member or cam 36. Loosely mounted on the shaft 35 is a gear 37 that engages and drives a pinion 38 connected to the paper feed roll. The loosely mounted gear 37 has a projection or stop 40, see Fig. 3, extending from its inner side and engageable with a fixed stop 41 on the gear box to limit the return movement of gear 37 and insure always bringing it back to a definite initial position. 42 is a projection or stop extending from the opposite side of gear 37 into the path of a stop or projection 43 carried on the adjacent surface of the cam 36 so that when the operating member or cam 36 is turned in an anti-clockwise direction, see Fig. 6, the stop 43 on the cam engages stop 42 on the gear 37 and turns gear 37 correspondingly and likewise the feed roll. The pinion 38, that is actuated by gear 37, is fixed on a shaft which is connected, through a friction roller clutch 44, see Figs. 3 and 12, with the shaft 45 which carries the paper feed roll 46. By arranging the friction clutch 44 between pinion 38 and the paper feed roll 46, the latter is operated when the pinion 38 is driven in one direction, and when the paper feed mechanism is returned to initial position after completion of the feeding operation, the feed roll 46 remains idle to prevent winding of the paper backwardly.

Figure 4:
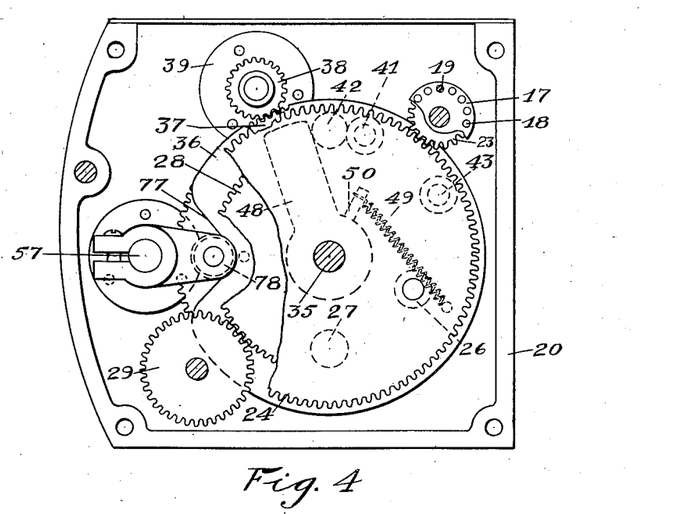
Fig. 4 is a transverse vertical sectional view on line 4—4 of Fig. 2 looking in the direction of the arrows, with the parts in neutral position.

Movement of the operating member or cam 36 in a direction opposite to that already described, is utilized to effect movement of the paper severing means, as will be described later, and to accomplish this, the cam 36 is connected to gear 37 in such a way as to effect return of the latter to initial position while permitting further reverse movement of the cam to effect the cutting operation. To this end, an arm 48 is loosely mounted on the shaft 35 in the path of the aforementioned stop 42 on gear 37 and is normally held against said stop as shown in Fig. 4 by a spring 49 connected at one end to the cam 36 and at its opposite end to a lug 50 carried by the arm 48. Thus the spring 49 normally holds the arm 48 against stop 42, and likewise holds stop 40 against stop 41 when the gear is in its initial position, the tension of the spring 49 being sufficient to return the gear 37 to neutral position when the operating member or cam is returned. The spring 49 also permits further reverse movement of the cam 36 to effect the paper severing operation, without moving the gear 37, as will appear presently.

The paper is fed, after exposure, by turning handle 31, which actuates feed roll 46, as already described, the latter being then engaged by a pressure roll which holds the paper thereagainst. During the exposure operation, the pressure roll is in a lowered position away from the feed roll and out of the focal plane, the paper being then held by clamping means. Before feeding, the paper is reengaged by the pressure roll and the clamping means released, and the mechanism which will next be described has to do with the movable pressure roll and clamping means, and the manner in which their operation is controlled.

Figure 5:
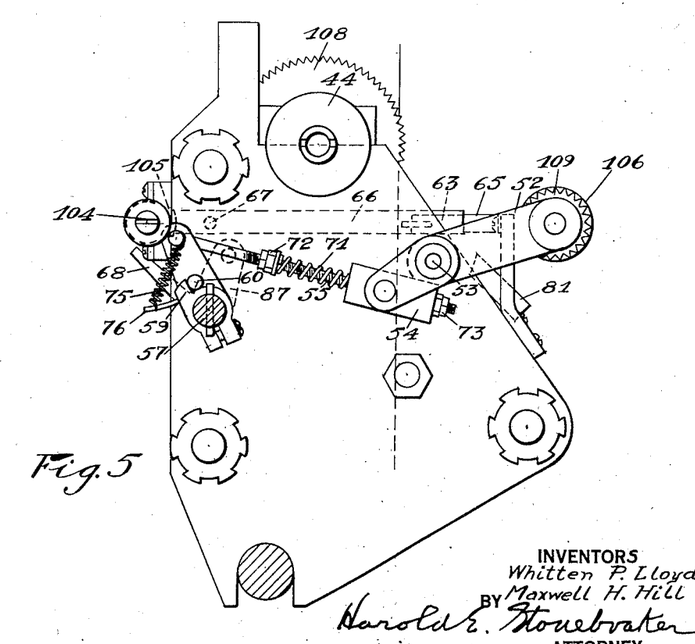
Fig. 5 is a similar vertical sectional view on line 5—5 of Fig. 2 looking in the direction of the arrows, with the parts in neutral position, and showing the paper clamping means released to permit rewinding the paper into the roll box.
Figure 6:
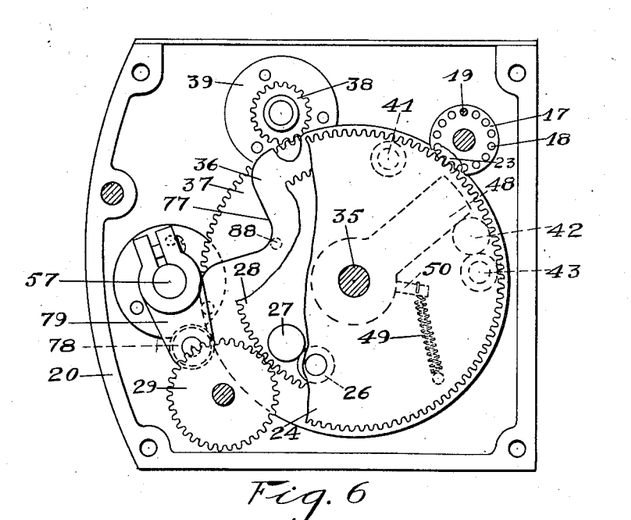
Fig. 6 is a transverse vertical sectional view on line 4—4 of Fig. 2 looking in the direction of the arrows, and showing the parts in the position assumed during the paper feeding operation.
Figure 7:
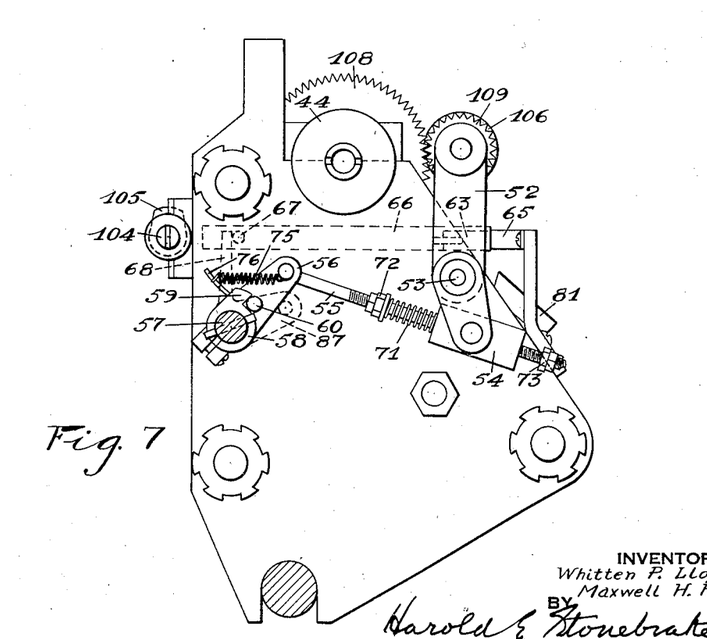
Fig. 7 is a transverse vertical sectional view on line 5—5 of Fig. 2 looking in the direction of the arrows, with the parts in the position assumed during the paper feeding operation.

The pressure roll, designated generally at 51, see Figs. 2 and 3, is mounted on arms 52, see Fig. 5, which are pivoted to swing about an axis 53 whereby the pressure roll is movable from its lower position, as shown in Fig. 5, to its upper position as shown in Fig. 7, where it is adjacent to the focal plane and holds the paper against the feed roll, and after feeding is completed, when the parts are returned to initial position, the pressure roll is again swung downwardly to the position shown in Fig. 5. To accomplish this, each of the arms 52 carries a pivoted sleeve 54, see Fig. 5, in which is slidably mounted a rod 55 pivotally connected to an arm 56 that is loosely mounted on a rock shaft 57, while 58 is a collar fixed on said rock shaft and carrying an ear 59 arranged to engage a pin 60 on the arm 56. Thus when the rock shaft 57 is turned in a clockwise direction, see Fig. 5, the ear 59 engages pin 60 and swings the arm 56, likewise moving rod 55 from the position shown in Fig. 5 to the position shown in Fig. 7, swinging the pressure roll upwardly preliminarily to the paper feeding operation.

Figure 10:
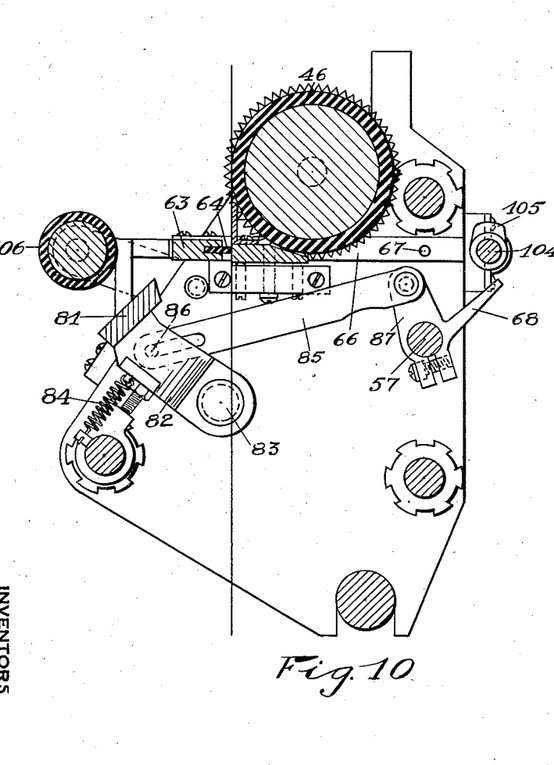
Fig. 10 is a transverse vertical sectional view on line 10—10 of Fig. 2 looking in the direction of the arrows, and showing the pressure roll in lowered position, the clamping means engaged with the paper, and the cutting mechanism in idle position.
Figure 11:
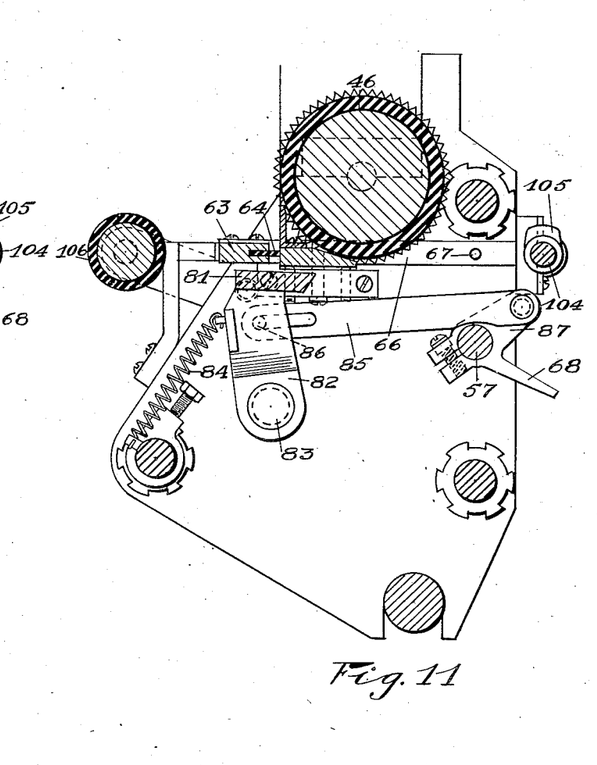
Fig. 11 is a sectional view similar to Fig. 10, showing the position of the parts at the end of the cutting mechanism.

During exposure, the sensitized paper is held against the focal plane plate or back at the bottom by a clamping means preferably consisting of a clamping plate 63 that is mounted for bodily sliding movement in a horizontal plane toward and from the paper and carries a rubber strip 64 which engages the paper, see Figs. 10 and 11, to hold it taut during exposure when the pressure roll is down. The clamping plate is held in the position just described by the springs 65, see Fig. 3, and is automatically moved out of clamping position to release the paper, as shown in Fig. 7, immediately after the pressure roll has engaged the paper. To accomplish this, the clamping plate 63 has connected to it a pair of rearwardly extending bars 66, each of which carries a pin 67, see Figs. 10 and 11, that are engaged by arms 68 fixed on the rock shaft 57 so that at the limit of the latter's movement, after the pressure roll has engaged with the feed roll, the arms 68 engage the pins 67 as shown in Fig. 7, and move the bars 66 to the right and the clamping means away from the paper so that the latter is then free to be fed. The movement just described of the clamping means, after the pressure roll has engaged the feed roll, is made possible by a spring 71, see Fig. 7, located on the rod 60 between the sleeve 54 and a fixed collar 72, the rod 60 being slidable through the sleeve 54 and its return movement being limited by a nut 73 secured to the end of the rod. Thus as rod 60 is moved to the right, when the rock shaft 57 is turned clockwise, as shown in Fig. 5, the initial movement brings the pressure roll upwardly into contact with the feed roll and the final movement permits compression of the spring 71, see Fig. 7, holding the pressure roll under yieldable tension against the feed roll and permitting the clamping means to be withdrawn from engagement with the paper, as already described. The ear 59 is held normally against pin 60, see Fig. 5, by a spring 75 connected at one end to an arm 76 projecting from collar 58 and at its other end to the arm 56. This arrangement permits the rock shaft 57 to turn in a reverse direction, as shown in Fig. 9, to effect the paper servering operation that will be described presently.

The rock shaft 57 is controlled by the operating member or cam 36 previously described, and to this end the cam 36 is cut away at 77, see Fig. 4, to receive a roller or projection 78 on the arm 79 which is fixedly mounted on the rock shaft 57. These parts are so related that when the operating handle 31 is turned in a clockwise direction and the operating member or cam 36 is at the same time turned in an anti-clockwise direction, the initial part of such movement during the first 45° of turning causes movement of the rock shaft 57 from the neutral position shown in Fig. 4 to the position shown in Fig. 6. During this movement of the cam, the pressure roll is moved upwardly into engagement with the feed roll to the position shown in Fig. 7, and the clamping means is withdrawn from engagement with the paper. The parts are now ready to feed the paper, and upon further turning of the cam 36, the stop 43 on the cam engages stop 42 on gear 37 and turns the feed roll to feed the paper, as already described. This feeding movement of the paper continues until the stop 27 on gear 23 engages stop 26 on gear 24, the position of which definitely determines the extent of operation of the feeding mechanism as the parts can move no farther. The handle 31 which controls the paper feeding mechanism is then turned in a reverse direction to bring the parts previously described back to normal position, and they are then ready for the paper severing operation which is effected by turning handle 31 from its neutral position in the opposite direction to that already described, causing movement of the cam 36 and rock shaft 57 from the position shown in Fig. 4 to that shown in Fig. 8.

Figure 8:
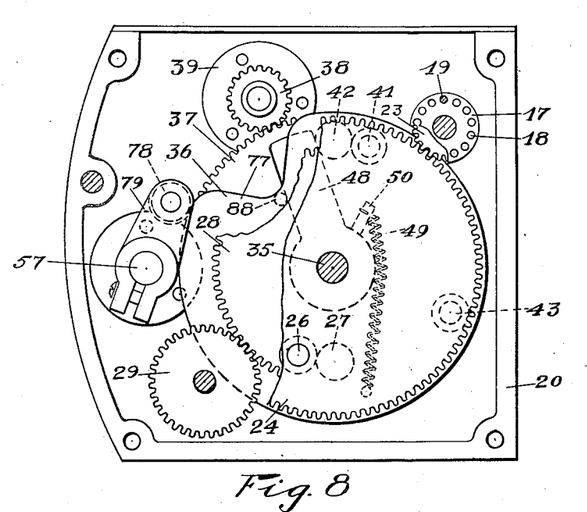
Fig. 8 is a transverse vertical sectional view similar to Fig. 6, showing the position of the parts when severing the paper.
Figure 9:
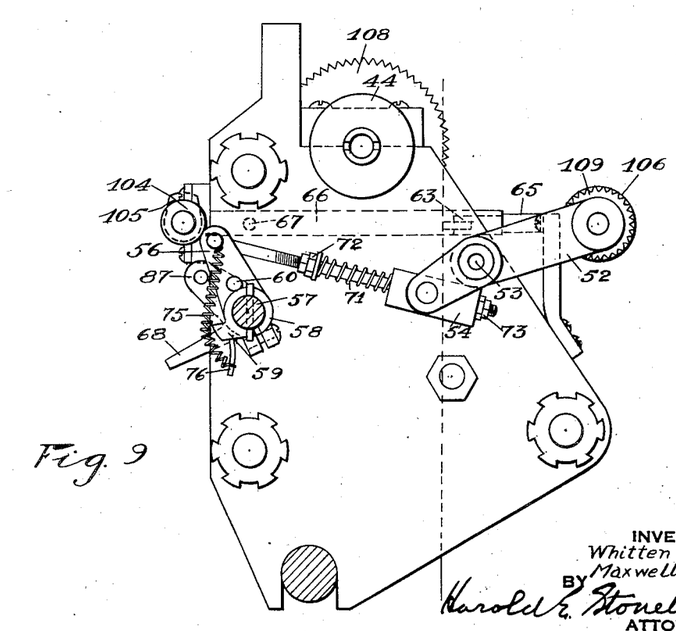
Fig. 9 is a transverse vertical sectional view similar to Fig. 7, showing the position of the parts during the paper severing operation.

The paper severing mechanism comprises a knife 81, see Figs. 10 and 11, mounted on supports 82 pivoted at 83, while 84 is a spring for retracting the cutting means when released to inactive position, as shown in Fig. 2. To operate the knife 81, a pair of links 85 have slotted connection with pins 86 on the arms 82 and are pivoted to bell cranks 87 which are fixed on the aforementioned rock shaft 57, so that when the latter is turned in a reverse direction from that previously described, the cutting mechanism is moved from the position shown in Fig. 10 to that shown in Fig. 11 to sever the portion of the paper which has been previously fed. Upon completion of the paper severing operation, the handle 31 is again turned back to neutral position, and the parts are ready for another exposure and paper feeding operation, as already described. During the paper severing operation, movement of the cam 36 is limited by a stop 88 carried by the cam and engaging with the arm 48 when it reaches the latter, as shown in Fig. 8.

Figure 13:
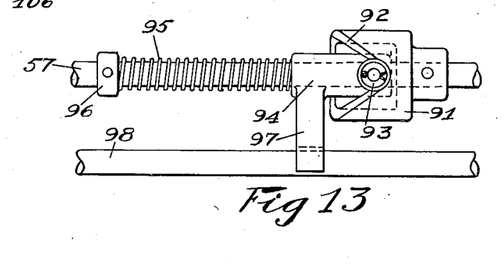
Fig. 13 is an enlarged detail elevation looking in the plane 13—13 of Fig. 3 in the direction indicated.
Figure 14:
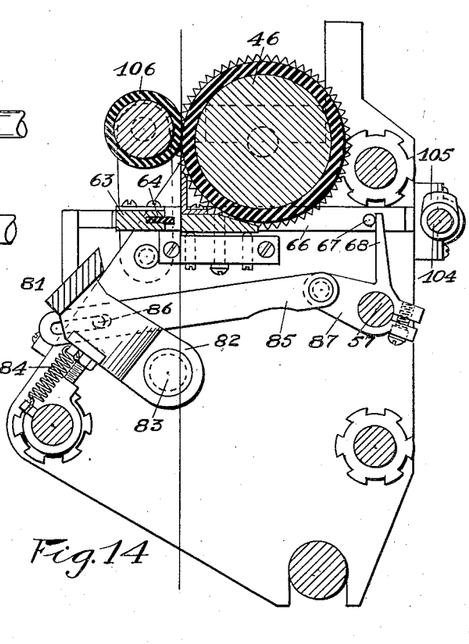
Fig. 14 is a sectional view similar to Fig. 10 showing the clamping means released and the pressure roll moved upwardly into paper feeding relation with the feeding roll.
Figure 15:
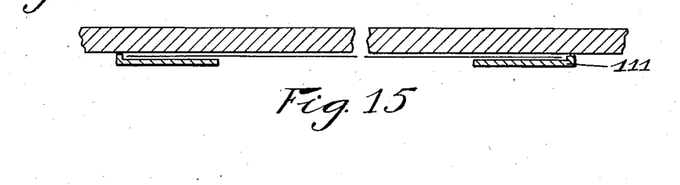
Fig. 15 is a horizontal sectional view through the paper guides.
Figures 16, 17:
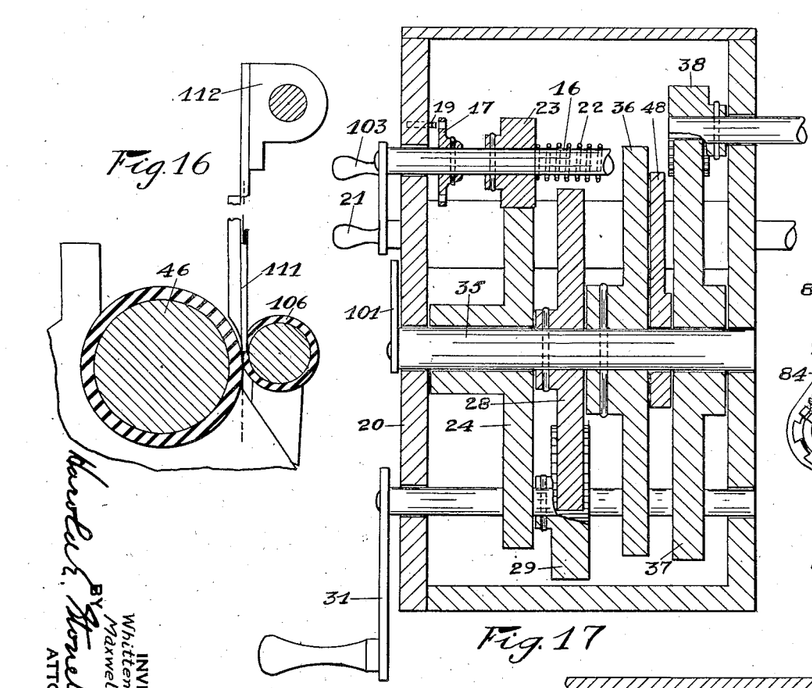
Fig. 16 is a transverse vertical sectional view through the feed and pressure rolls.
Fig. 17 is a longitudinal vertical sectional view through the control box taken on line 17—17 of Fig. 3.

It is necessary to return the rock shaft 57 to its neutral position when the cam 36 reaches a position to permit the same, and this is accomplished by the structure shown in Fig. 13, which includes a cam 91 fixed on the rock shaft 57. The cam is cylindrical in form and has a cutaway portion 92 that is engaged by a roller or projection 93 on a sleeve 94 that is slidable on the shaft and is actuated toward the cam by a spring 95 positioned between the sleeve 94 and a fixed collar 96. The sleeve 94 is held against turning movement by a laterally extending arm 97 having a bifurcated portion that straddles a fixed bar 98 on the machine.

With this arrangement, when the rock shaft 57 is turned in one direction or the other by rotation of the cam 36, the sleeve 94 is moved endwise against the action of spring 95, and when the cam 36 is returned to neutral position, permitting roller 78 to drop into the recess 77, the spring 95 is of sufficient strength to move sleeve 94 endwise and the action of the projection 93 on the cam surface 92 tends to rotate the cam 91 and rock shaft 57 until they are in the neutral position illustrated in Figs. 4 and 13, and to hold them in such position.

It will be understood that when the rock shaft is turned in one direction by the corresponding operation of the handle 31 and cam 36, the pressure roll is moved up into engagement with the paper, the clamping means is released, and the paper feeding operation takes place, these parts being returned to normal position upon return of the handle 31 and cam 36 to neutral position. Then by turning the handle 31 in the opposite direction, the rock shaft 57 is turned in an opposite direction to effect the paper severing operation, and the spring 95 and cam 91 are effective in returning the rock shaft to its neutral position from is extreme operative position in either direction.

It is desirable that the operator of the machine have a positive indication of the position and direction of movement of the cam 36, and this is accomplished by extending the shaft 35, which carries the cam, through the wall of the gear box, as shown in Fig. 1, and mounting on its outer end an indicator 101 which turns with the shaft 35 on which the operating member or cam is mounted. Suitable indicia are provided on the outer surface of the gear box indicating "Feed" in one direction, "Cut" in the opposite direction, and "N" for neutral, at the central point, thus showing when the operating member or cam is in neutral position, and if it is turning, whether it is turning in the direction to cut or to feed the paper.

It is sometimes necessary to release the paper clamping means to rewind the paper into the roll box, and this can be accomplished by turning a handle 103, see Fig. 1, mounted on a shaft 104, see Figs. 10 and 11, which carries cams 105 arranged to engage the adjacent ends of the bars 66 which are connected to the clamping plate. Thus by turning the shaft 104 to the position indicated in Fig. 5, the clamping means is moved away from the paper and the latter is free to be drawn back into the roll box.

When the feed and pressure rolls engage the paper throughout the width of the paper, there is sometimes a tendency for the paper to twist or skew as it goes through the machine, and this objection is overcome in the present structure by engaging the paper only at a central zone between the side edges, leaving it free from contact with the feed and pressure rolls for a substantial distance at its edges so that the feeding pressure takes place only at the central part of the paper strip. This is illustrated in Fig. 2 where feed roll 46 is shown as of the same diameter throughout its length, while the pressure roll 51 has a central portion 106 which engages the paper and presses it against the feed roll while the end portions 107 are of reduced diameter, the side portions of the paper beyond the central portion 106 riding freely between the feed roll 46 and the reduced end portions 107. The pressure roll, when engaged with the feed roll, is turned by a gear 108 fixedly carried by the feed roll and turning therewith through the mechanism already described, gear 108 meshing with gear 109 on the pressure roll when the latter is swung upwardly into paper feeding position.

It is also desirable to provide means for preventing the paper curling or warping away from the focal plane at its edges, and this is accomplished in the present structure by a pair of vertical guides 111 each of which is L-shaped in cross-section to overlie the edge of the paper and also extend across the surface of the paper for a portion of its width. It will be understood that the guides 111 cooperate with the edges of the paper strip from top to bottom of the focal plane, and they are adjustable uniformly in a lateral direction so as to make possible proper cooperation with paper sheets of different widths. This is accomplished by providing each vertical guide with a nut 112 that engages a threaded portion 113 on the adjusting shaft 114, the latter being mounted in suitable bearings in the frame of the machine and having an operating handle 115 at its outer end. The guides 111 are supported on the shaft 114, the portions 113 being threaded in opposite directions, and by turning the handle 115 and shaft 114 likewise, the guides 111 are moved uniformly in opposite directions toward or from the center of the paper strip so that they are brought into proper relationship with the edges of the paper.

The invention has been shown and described with reference to certain structural embodiments of a hand operated machine, but it will be understood that the improvements are equally applicable to an automatic machine, and the application is not confined to the details of construction or relation of parts herein specifically set forth. It is the purpose to cover such adaptations, modifications or departures as may come within the contemplated purposes of the invention or the scope of the following claims.

We claim:

1. In a photocopy machine, the combination with paper feeding mechanism, paper cutting instrumentalities, and a rotatable member operatively associated with the paper feed mechanism to actuate it when moved in one direction and operatively associated with the paper cutting instrumentalities to actuate the same when moved in the opposite direction.

2. In a photocopy machine, the combination with paper feeding mechanism including a paper feed gear, of a pressure roll for the paper, paper clamping means, a rotatable member operating during the first part of its movement in one direction to move the pressure roll into engagement with the paper and withdraw the paper clamping means, and during the subsequent part of its movement in the same direction to operate the paper feed gear, and paper cutting instrumentalities operatively associated with and operated by said rotatable member when moved in the opposite direction.

3. In a photocopy machine, the combination with paper feed mechanism including a paper feed gear, a shaft on which said gear is loosely mounted, a stationary stop, a stop carried by said paper feed gear and normally engaging said stationary stop, a second stop carried by the paper feed gear, an arm loosely mounted on said shaft and engaging said last named stop to hold the paper feed gear against said stationary stop, a cam fixedly mounted on said shaft, a spring connecting said arm and said cam, a stop on said cam for engagement with said last named stop on the paper feed gear to move the latter in one direction, said arm acting to return the paper feed gear to normal position when the cam is returned, and paper cutting instrumentalities, the cam when moving in a reverse direction serving to operate the paper cutting instrumentalities and said paper feed gear being held against said stationary stop during the reverse movement of the cam.

4. In a photocopy machine, the combination with paper feed mechanism, of a cam for effecting operation of the same during a part of its movement in one direction, a pressure roll and paper clamping means, a rock shaft controlling the same so as to move the pressure roll upwardly into engagement with the paper before disengaging the clamping means and to reengage the clamping means before disengaging the pressure roll and moving it downwardly, said cam being operatively associated with the rock shaft to move the latter in one direction during the initial part of its travel and before operating the paper feed mechanism, paper cutting mechanism also controlled by said rock shaft when the latter is moved in the opposite direction, and said cam being operable in a reverse direction to operate the rock shaft and paper cutting mechanism, the paper feed mechanism being stationary during the reverse movement of the cam.

5. In a photocopy machine, the combination with paper feed mechanism, of paper cutting mechanism, and a rotary member operatively associated therewith and operating when turned in one direction to actuate the feed mechanism and when turned in the opposite direction to actuate the cutting mechanism.

6. In a photocopy machine, the combination with paper feed mechanism, of paper cutting mechanism, a pressure roll, paper clamping means, and a rotary member operating when turned in one direction to actuate the pressure roll, paper clamping means, and feed mechanism successively, and when turned in the opposite direction to actuate the cutting mechanism.

7. In a photocopy machine, the combination with paper cutting mechanism, of paper clamping means, a pressure roll, a rock shaft operatively associated with said parts to operate the paper cutting mechanism when moved in one direction and to operate the pressure roll and paper clamping mechanism when moved in the opposite direction, and a cam operatively associated with said rock shaft and movable in opposite directions for operating the same.

8. In a photocopy machine, the combination with paper clamping means, spring elements normally holding the paper clamping means against the paper, a paper feeding roll, a pressure roll movable into and out of engagement with the feeding roll, mechanism controlling the position of the pressure roll and acting to move the clamping means away from clamping position when the pressure roll is engaged with the feeding roll, paper cutting mechanism, and devices operable to actuate the paper cutting mechanism while the clamping means is engaged with the paper and the pressure roll is disengaged from the feeding roll.

9. In a photocopy machine, the combination with a paper feeding roll, a pressure roll movable into and out of engagement with the feeding roll, paper clamping means, paper cutting mechanism, a rock shaft movable in one direction to operate the clamping means and pressure roll and movable in the opposite direction to operate the paper cutting mechanism, an arm on said rock shaft, and a cam movable in either direction and cooperating with said arm to move the rock shaft in opposite directions.

10. In a photocopy machine, the combination with a paper feeding roll, a pressure roll movable into and out of engagement with the feeding roll, paper clamping means, paper cutting mechanism, a rock shaft movable in one direction to operate the clamping means and pressure roll and movable in the opposite direction to operate the paper cutting mechanism, an arm on said rock shaft, a cam movable in either direction and cooperating with said arm to move the rock shaft in opposite directions, and devices controlled by said cam for operating the paper feeding roll subsequently to the operation of the pressure roll and paper clamping means, the paper feeding roll being idle when the cam is moved in the opposite direction to operate the paper cutting mechanism.

11. In a photocopy machine, the combination with paper feed mechanism, of cutting mechanism, a rock shaft controlling the cutting mechanism when moved in one direction, a pressure roll and clamping means controlled by the rock shaft when moved in the opposite direction, an arm on said rock shaft, a rotary cam cooperating with said arm and operating when moved in one direction to actuate the paper feed mechanism, and means connected to the rock shaft for normally retaining it in neutral position.

12. In a photocopy machine, the combination with a pressure roll and paper clamping means, of paper cutting mechanism, a rock shaft movable in opposite directions and operatively associated with the aforesaid parts, a cam carried by said rock shaft, and a spring actuated follower engaging said cam and acting to move it to neutral position when released.

WHITTEN P. LLOYD.
MAXWELL H. HILL.